(12) United States Patent
Orlando et al.

(10) Patent No.: US 9,726,113 B2
(45) Date of Patent: Aug. 8, 2017

(54) TURBINE ENGINE ASSEMBLY AND METHODS OF ASSEMBLING SAME

(71) Applicant: General Electric Company, Schenectady, NY (US)

(72) Inventors: Robert Joseph Orlando, West Chester, OH (US); Thomas Ory Moniz, Loveland, OH (US); Alan Roy Stuart, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 611 days.

(21) Appl. No.: 14/149,511

(22) Filed: Jan. 7, 2014

(65) Prior Publication Data

US 2014/0119885 A1    May 1, 2014

Related U.S. Application Data

(63) Continuation of application No. 12/363,427, filed on Jan. 30, 2009, now abandoned.

(51) Int. Cl.
*F02K 3/072* (2006.01)
*F02C 7/36* (2006.01)

(52) U.S. Cl.
CPC .............. *F02K 3/072* (2013.01); *F02C 7/36* (2013.01); *F05D 2220/323* (2013.01); *F05D 2220/327* (2013.01); *Y10T 29/49229* (2015.01)

(58) Field of Classification Search
CPC ...... F02K 3/072; F02C 7/36; F05D 2220/323; F05D 2220/327
See application file for complete search history.

(56) References Cited

U.S. PATENT DOCUMENTS

| | | |
|---|---|---|
| 3,673,802 A | 7/1972 | Krebs et al. |
| 3,729,957 A | 5/1973 | Petrie et al. |
| 3,861,139 A | 1/1975 | Jones |
| 4,817,382 A | 4/1989 | Rudolph et al. |
| 5,010,729 A | 4/1991 | Adamson et al. |
| 5,274,999 A | 1/1994 | Rohra et al. |
| 5,315,821 A | 5/1994 | Dunbar et al. |

(Continued)

OTHER PUBLICATIONS

JPO Office Action for related matter TPO-7219 dated Oct. 29, 2013.

*Primary Examiner* — Moshe Wilensky
(74) *Attorney, Agent, or Firm* — General Electric Company; William Scott Andes

(57) ABSTRACT

A turbine engine assembly is provided. The turbine engine assembly includes a core gas turbine engine including a first rotatable drive shaft, a first low-pressure turbine section in serial flow communication with the gas turbine engine, a gear assembly coupled to the first low-pressure turbine section through a second rotatable drive shaft, and a second low-pressure turbine section in serial flow communication with the core gas turbine engine. The first low-pressure turbine section is configured to rotate in a first rotational direction, and the second low-pressure turbine section is configured to rotate in a second rotational direction opposite the first rotational direction. The first and second low-pressure turbine sections are spaced axially apart from each other. The turbine engine assembly also includes a fan assembly coupled to the first low-pressure turbine section through the gear assembly, and coupled to the second low-pressure turbine section through a third rotatable drive shaft.

7 Claims, 3 Drawing Sheets

(56) References Cited

U.S. PATENT DOCUMENTS

| | | |
|---|---|---|
| 6,964,155 B2 | 11/2005 | McCune et al. |
| 7,107,756 B2 | 9/2006 | Rolt |
| 7,246,482 B2 | 7/2007 | Mahoney et al. |
| 7,363,757 B2 | 4/2008 | Loisy |
| 7,451,592 B2 | 11/2008 | Taylor et al. |
| 7,752,836 B2 | 7/2010 | Orlando et al. |
| 7,788,899 B2 | 9/2010 | Smith |
| 7,950,220 B2 | 5/2011 | Merry et al. |
| 8,015,798 B2 | 9/2011 | Norris et al. |
| 8,104,261 B2 | 1/2012 | Marshall et al. |
| 8,166,748 B2 | 5/2012 | Schilling |
| 2005/0226720 A1 | 10/2005 | Harvey et al. |
| 2006/0090448 A1 | 5/2006 | Henry |
| 2006/0185346 A1 | 8/2006 | Rolt |
| 2006/0236675 A1 | 10/2006 | Weiler |
| 2007/0051091 A1 | 3/2007 | Rolt |
| 2008/0149445 A1 | 6/2008 | Kem et al. |
| 2009/0123274 A1 | 5/2009 | Chaudhry |
| 2010/0089028 A1 | 4/2010 | Baltas |
| 2010/0154384 A1 | 6/2010 | Schilling |
| 2010/0192595 A1 | 8/2010 | Orlando et al. |

TURBINE ENGINE ASSEMBLY AND METHODS OF ASSEMBLING SAME

CROSS REFERENCE TO RELATED APPLICATIONS

This application is a continuation and claims priority to U.S. patent application Ser. No. 12/363,427 filed Jan. 30, 2009 for "GAS TURBINE ENGINE ASSEMBLY AND METHODS OF ASSEMBLING SAME", which is hereby incorporated by reference in its entirety.

BACKGROUND OF THE INVENTION

This invention relates generally to gas turbine engines, and more specifically to gas turbine engine assemblies and methods of assembling the same.

At least some known gas turbine engines include a fan, a core engine, and a power turbine. The core engine includes at least one compressor, a combustor, a high-pressure turbine and a low-pressure turbine coupled together in a serial flow relationship. More specifically, the compressor and high-pressure turbine are coupled through a shaft to define a high-pressure rotor assembly. Air entering the core engine is mixed with fuel and ignited to form a high energy gas stream. The high energy gas stream flows through the high-pressure turbine to rotatably drive the high-pressure turbine such that the shaft, in turn, rotatably drives the compressor.

The gas stream expands as it flows through the low-pressure turbine positioned aft of the high-pressure turbine. The low-pressure turbine includes a rotor assembly having a fan coupled to a drive shaft. The low-pressure turbine rotatably drives the fan through the drive shaft.

Modern commercial turbofans tend toward higher bypass ratios to improve efficiency. For acoustic and fan efficiency reasons, it is desirable to reduce fan RPM or tip speed. However, a lower RPM increases low-pressure turbine loading, diameter and/or stage count. A fan directly driven by the low-pressure turbine limits the choice in fan speed because a slight reduction in fan speed for improved performance results in poorer performance in the low-pressure turbine.

BRIEF DESCRIPTION OF THE INVENTION

In one aspect, a turbine engine assembly is provided. The turbine engine assembly includes a core gas turbine engine including a first rotatable drive shaft, a first low-pressure turbine section in serial flow communication with the core gas turbine engine, a gear assembly coupled to the first low-pressure turbine section through a second rotatable drive shaft, and a second low-pressure turbine section in serial flow communication with the core gas turbine engine. The first low-pressure turbine section is configured to rotate in a first rotational direction, and the second low-pressure turbine section is configured to rotate in a second rotational direction opposite the first rotational direction. The first and second low-pressure turbine sections are spaced axially apart from each other. The turbine engine assembly also includes a fan assembly coupled to the first low-pressure turbine section through the gear assembly, and coupled to the second low-pressure turbine section through a third rotatable drive shaft.

In another aspect, a method of assembling a gas turbine engine is provided. The method includes coupling a first low-pressure turbine section downstream from a core gas turbine engine including a first rotatable drive shaft, coupling a gear assembly to the first low-pressure turbine section through a second rotatable drive shaft, and coupling a second low-pressure turbine section downstream from the core gas turbine engine. The first low-pressure turbine section is configured to rotate in a first rotational direction, and the second low-pressure turbine section is configured to rotate in a second rotational direction opposite the first rotational direction. The first and second low-pressure turbine sections are spaced axially apart from each other. The method also includes coupling a fan assembly to the first low-pressure turbine section through the gear assembly, and coupling the fan assembly to the second low-pressure turbine section through a third rotatable drive shaft.

In yet another aspect, a turbine engine assembly is provided. The turbine engine assembly includes a core gas turbine engine including a first rotatable drive shaft and a first low-pressure turbine section in serial flow communication with the core gas turbine engine. The first low-pressure turbine section is configured to rotate in a first rotational direction, and is coupled directly to a second rotatable drive shaft that directly drives a booster compressor and drives a fan assembly through a gear assembly. The turbine engine assembly also includes a second low-pressure turbine section in serial flow communication with the core gas turbine engine aft of the first low-pressure turbine section. The second low-pressure turbine section is configured to rotate in a second rotational direction opposite the first rotational direction, and is coupled directly to a third rotatable drive shaft that drives the fan assembly.

BRIEF DESCRIPTION OF THE DRAWINGS

FIG. 1 is a cross-sectional view of an exemplary turbine engine assembly;

FIG. 2 is a simplified representation of one embodiment of a turbine engine assembly in accordance with the present invention;

FIG. 3 is a simplified representation of one embodiment of a turbine engine assembly in accordance with the present invention; and FIG. 4 is a simplified representation of an additional embodiment of a turbine engine assembly in accordance with the present invention; and FIG. 5 is a simplified representation of an additional embodiment of a turbine engine assembly in accordance with the present invention.

DETAILED DESCRIPTION OF THE INVENTION

Figure 1:
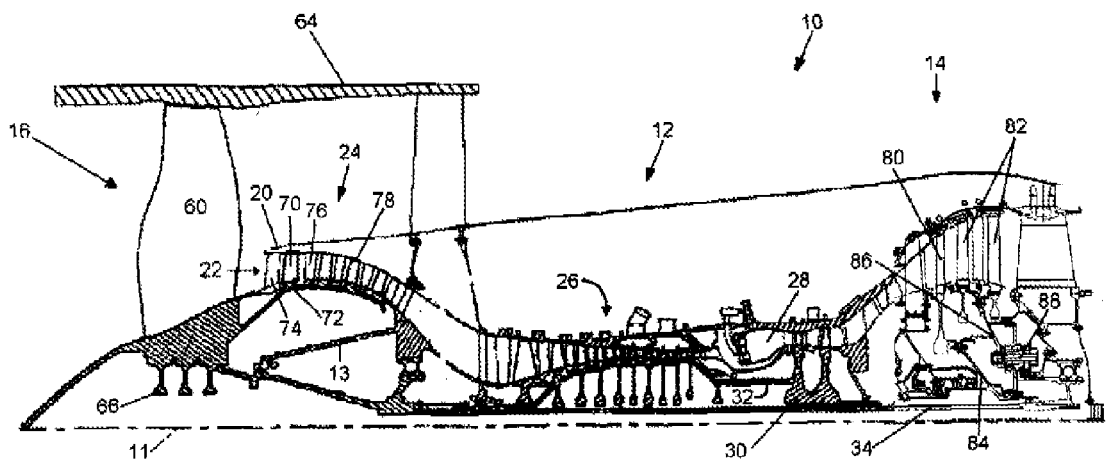
FIGS. 1-5 show exemplary embodiments of the assembly and method described herein.

FIG. 1 is a cross-sectional view of a portion of an exemplary turbine engine assembly 10 having a longitudinal axis 11. In the exemplary embodiment, turbine engine assembly 10 includes a core gas turbine engine 12 generally defined by a casing 13. A low-pressure turbine 14 is coupled axially aft of core gas turbine engine 12 and a single-stage fan assembly 16 is coupled axially forward of core gas turbine engine 12.

Core gas turbine engine 12 includes an outer casing 20 that defines an annular core engine inlet 22. Casing 20 surrounds a low-pressure booster compressor 24. Single-stage fan assembly 16 increases the pressure of incoming air to a first pressure level and directs a portion of the incoming air to the low-pressure booster compressor 24. Low-pressure booster compressor 24 receives air from the single-stage fan assembly 16 and facilitates increasing the pressure to a higher, second pressure level. In one embodiment, core gas turbine engine 12 is a core CFM56 gas turbine engine available from General Electric Aircraft Engines, Cincinnati, Ohio. In another embodiment a high pressure core is used and the booster is not.

In some embodiments, a high-pressure, multi-stage, axial-flow compressor 26 receives pressurized air from booster compressor 24 and further increases the pressure of the air to a third, higher pressure level. The high-pressure air is channeled to a combustor 28 and is mixed with fuel. The fuel-air mixture is ignited to raise the temperature and energy level of the pressurized air. The high energy combustion products flow to a first or high-pressure turbine 30 for driving compressor 26 through a first rotatable drive shaft 32, and then to second or low-pressure turbine 14. After driving low-pressure turbine 14, the combustion products leave turbine engine assembly 10 through an exhaust nozzle (not shown) to provide propulsive jet thrust.

In one embodiment, booster compressor 24 includes a plurality of rows of rotor blades 70 that are coupled to a respective rotor disk 72. Booster compressor 24 is positioned aft of an inlet guide vane assembly 74 and is coupled to a drive shaft 34 such that booster compressor 24 rotates at a rotational speed that is substantially equal to a rotational speed of fan assembly 16. Although booster compressor 24 is shown as having only three rows of rotor blades 70, booster compressor 24 may have any suitable number and/or rows of rotor blades 70, such as a single row of rotor blades 70 or a plurality of rows of rotor blades 70 that are interdigitated with a plurality of rows of guide vanes 76. In one embodiment, guide vanes 76 are fixedly or securely coupled to a booster case 78. In an alternative embodiment, rotor blades 70 are rotatably coupled to rotor disk 72 such that guide vanes 76 are movable during engine operation to facilitate varying a quantity of air channeled through booster compressor 24. In another alternative embodiment, turbine engine assembly 10 does not include booster compressor 24.

Low-pressure turbine 14 includes two sections, a first section 80 and a second section 82. Although first section 80 is shown with one stage and second section 82 is shown with two stages each section may have multiple or single stages in other embodiments. First section 80 is coupled to a first intermediate drive shaft 84 and rotates in a first direction with a first rotational speed while second section 82 is coupled to a second intermediate drive shaft 86 and rotates in a second direction with a second rotational speed. Both first and second intermediate drive shafts 84 and 86 are coupled to second rotatable drive shaft 34 through a gear assembly 88. In the exemplary embodiment gear assembly 88 is a planetary (star type) reversing and speed reducing gear assembly. In other embodiments, gear assembly 88 may be any other type of gear assembly.

Second rotatable drive shaft 34 drives fan assembly 16. Fan assembly 16 is configured to rotate about longitudinal axis 11 in a second rotational direction, includes at least one row of rotor blades 60, and is positioned within a fan case 64. Rotor blades 60 are coupled to a rotor disk 66.

Figure 2:
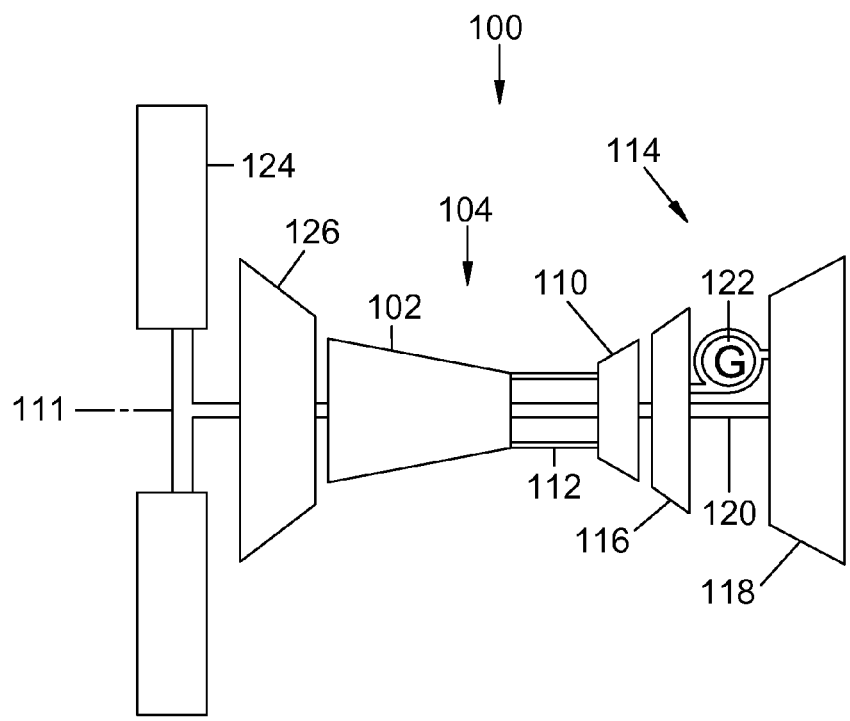

FIG. 2 describes one embodiment of the claimed invention. In the exemplary embodiment, gas turbine engine 100 includes a compressor 102, a core gas engine 104, a high pressure turbine 110 and a low-pressure turbine 114 in serial flow arrangement. High pressure turbine 110 drives compressor 102 through a first rotatable shaft 112. Low pressure turbine 114 includes two sections, a first section 116 and a second section 118. Although not shown, the first section 116 and the second section 118 may have multiple or single stages in various embodiments. First section 116 is coupled to a first intermediate drive shaft (not shown) and rotates in a first direction with a first rotational speed while second section 118 is coupled to a second intermediate drive shaft (not shown) and rotates in a second direction with a second rotational speed. Both first and second intermediate drive shafts (not shown) are coupled to second rotatable drive shaft 120 through a gear assembly 122. Second rotatable drive shaft 120 drives a fan assembly 124 and a low-pressure booster compressor 126. Fan assembly 124 is configured to rotate about longitudinal axis 111 in a second rotational direction.

Figure 3:
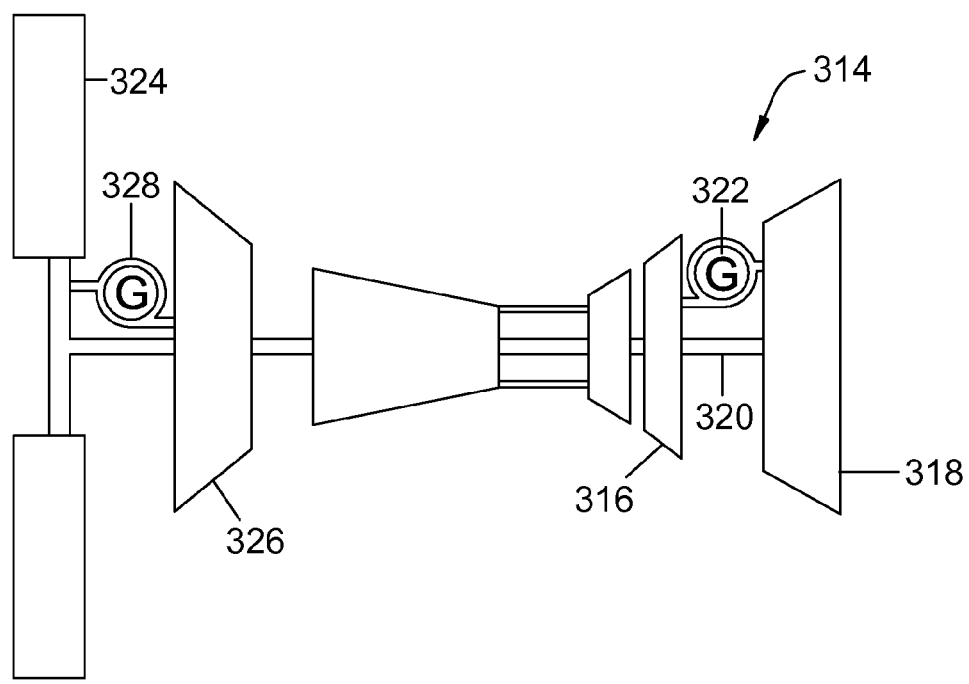

FIG. 3 describes another embodiment where a low pressure turbine 314 is divided into a first section 316 and a second section 318. First section 316 and second section 318 are coupled to a second rotatable drive shaft 320 through a first gear assembly 322. Second rotatable drive shaft 320 is coupled to and directly drives fan assembly 324. Second rotatable drive shaft 320 also drives the booster 326 through a second gear assembly 328.

Figure 4:
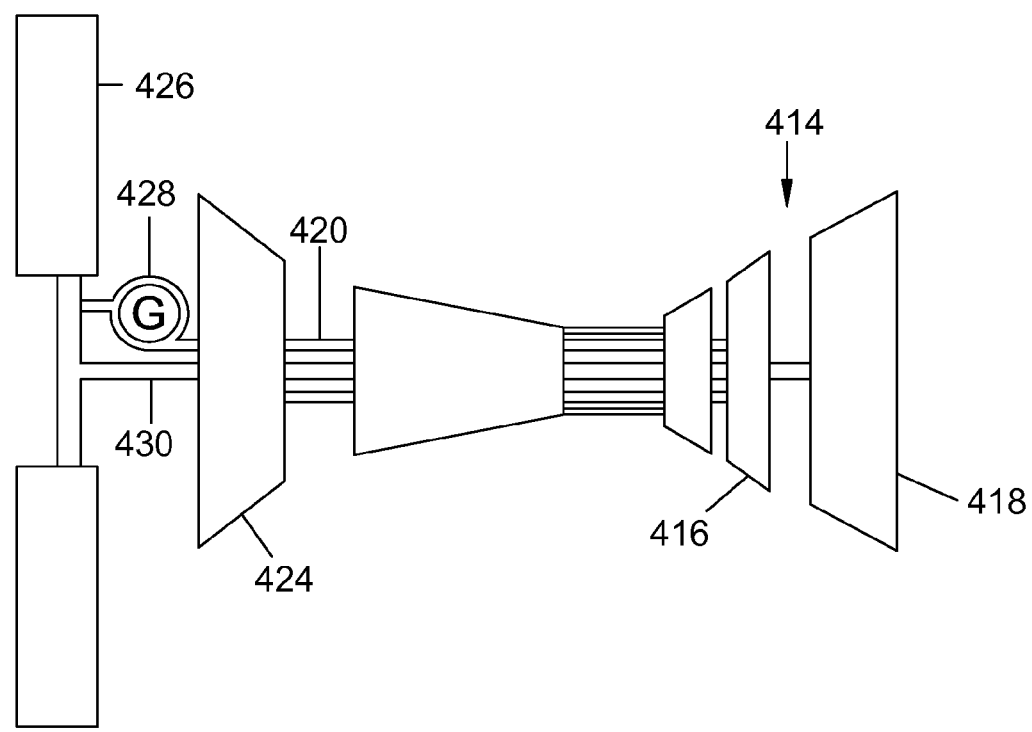

FIG. 4 describes still another embodiment where a low pressure turbine 414 is divided into a first section 416 and a second section 418. First section 416 couples directly to a second rotatable drive shaft 420 that directly drives a booster compressor 424 and drives a fan assembly 426 through a gear assembly 428. Second section 418 couples directly to a third rotatable drive shaft 430 that couples directly to and drives fan assembly 426.

Figure 5:
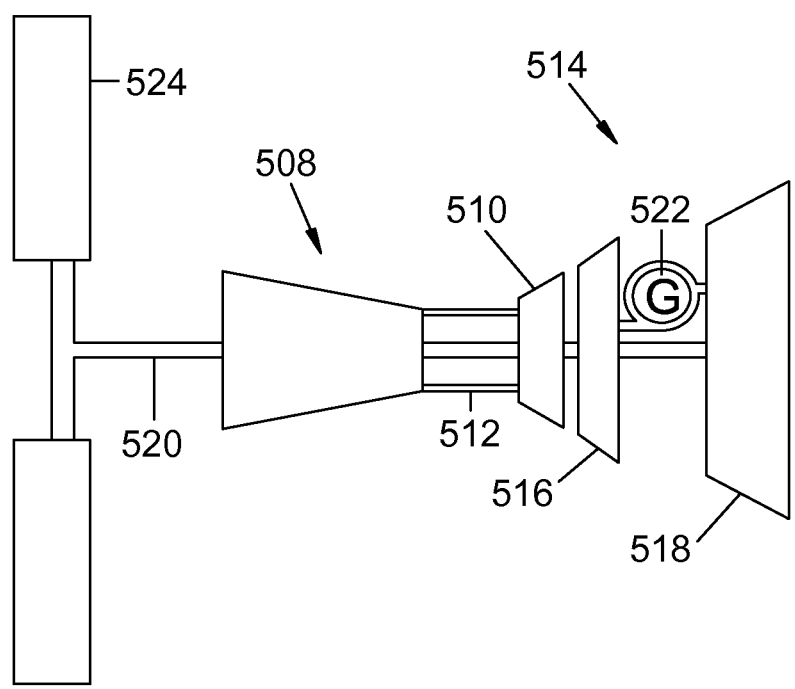

FIG. 5 describes still another embodiment where a high pressure core engine 508 is coupled to a high pressure turbine 510 through a first rotatable drive shaft 512. Low pressure turbine 514 is located axially aft of the high pressure turbine 510 and is divided into a first section 516 and a second section 518. First section 516 and second section 518 are coupled to a second rotatable drive shaft 520 through a first gear assembly 522. Second rotatable drive shaft 520 is coupled to and directly drives fan assembly 524.

Exemplary embodiments of a gas turbine engine assembly and methods of assembly the gas turbine engine assembly are described above in detail. The assembly and method are not limited to the specific embodiments described herein, but rather, components of the assembly and/or steps of the method may be utilized independently and separately from other components and/or steps described herein. Further, the described assembly components and/or the method steps can also be defined in, or used in combination with, other assemblies and/or methods, and are not limited to practice with only the assembly and/or method as described herein.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A turbine engine assembly comprising:
a core gas turbine engine comprising a first rotatable drive shaft;
a first low-pressure turbine section in serial flow communication with said core gas turbine engine, said first low-pressure turbine section configured to rotate in a first rotational direction;

a second low-pressure turbine section in serial flow communication with said core gas turbine engine, said second low-pressure turbine section configured to rotate in a second rotational direction opposite the first rotational direction, wherein said first and second low-pressure turbine sections are spaced axially apart from each other;

the first low-pressure turbine section and the second low-pressure turbine section are both coupled to a first gear assembly, and the first gear assembly is coupled to a second rotatable drive shaft;

a fan assembly directly coupled to the second rotatable drive shaft, and the second rotatable drive shaft is coupled to a second gear assembly and drives a booster compressor.

2. The turbine engine assembly in accordance with claim 1, wherein said first low-pressure turbine section is coupled downstream from said core gas turbine engine, and said second low-pressure turbine section is coupled downstream from said first low-pressure turbine section.

3. The turbine engine assembly in accordance with claim 1 wherein the booster compressor is coupled to said first low-pressure turbine section through said second rotatable drive shaft.

4. The turbine engine assembly in accordance with claim 1, wherein said first low-pressure turbine section is configured to rotate at a first rotational speed and said fan assembly is configured to rotate at a second rotational speed, wherein the first rotational speed is greater than the second rotational speed.

5. The turbine engine assembly in accordance with claim 1, wherein said fan assembly comprises a single stage fan.

6. The turbine engine assembly in accordance with claim 1, wherein said core gas turbine engine comprises a high-pressure core.

7. A turbine engine assembly comprising:
a core gas turbine engine comprising a first rotatable drive shaft;
a first low-pressure turbine section in serial flow communication with said core gas turbine engine, said first low-pressure turbine section configured to rotate in a first rotational direction, said first low pressure turbine section coupled to a second rotatable drive shaft through a first gear assembly that directly drives a a fan assembly; and
a second low-pressure turbine section in serial flow communication with said core gas turbine engine aft of said first low-pressure turbine section, said second low-pressure turbine section configured to rotate in a second rotational direction opposite the first rotational direction, said second low-pressure turbine section coupled to a second rotatable drive shaft through the first gear assembly and the second rotatable drive shaft is coupled to a second gear assembly and drives a booster compressor.

* * * * *